UNITED STATES PATENT OFFICE.

WILLIAM P. KOOKOGEY, OF BROOKLYN, NEW YORK, ASSIGNOR TO THE KOOKOGEY ELECTRIC COMPANY.

PROCESS OF MAKING SOLUTION COMPOUNDS FOR GALVANIC BATTERIES.

SPECIFICATION forming part of Letters Patent No. 409,291, dated August 20, 1889.

Application filed July 3, 1889. Serial No. 316,441. (No specimens.)

*To all whom it may concern:*

Be it known that I, WILLIAM P. KOOKOGEY, of the city of Brooklyn, county of Kings, and State of New York, have invented a new and useful Process of Making Solution Compounds for Galvanic Batteries, of which the following is a specification.

My invention relates to processes for making the dry compound which consists of trioxide of chromium and bisulphate of soda, and which may be converted into a solution for battery use merely by the addition of water.

In an application heretofore filed by me for a galvanic-battery solution, filed December 14, 1886, Serial No. 221,555, such a compound is described and a process for making it, and in two patents granted upon my application for methods of preparing solution compounds for galvanic batteries, each dated January 8, 1889, and numbered, respectively, 395,835 and 395,837, are described two improvements in such process; but in all three of those applications the processes start with taking sulphate of soda, sulphuric acid, and bichromate of soda as the fundamental ingredients, and the trioxide of chromium and bisulphate of soda are formed together in the course of such processes. I have, however, discovered that the trioxide and the acid sulphate may be made separately and afterward combined, and that the result in such case is an improvement for certain purposes over the methods by which they are made in combination with each other. This is the gist of the present invention. By the process herein described in which the two elements are separately made and afterward combined a compound is produced which may be made of any desirable degree of richness in chromium and suitable for any form of battery. The product may be made either as a plastic substance or it may be made as a substantially dry compound.

To describe the best way of following out the process more in detail take any strong solution of chromic acid, add thereto a quantity of sulphuric acid sufficient to precipitate the chromium contained in said solution in the form of trioxide of chromium, and decant the liquid above such semi-solid mass of trioxide. A solution of chromic acid well suited for this purpose is the solution made according to the formula described in the patent for galvanic-battery solution issued to me March 29, 1887, No. 360,024, or in the patent issued to me for a battery-solution, dated June 14, 1887, No. 364,656, as in such solution the sulphate of the base is absent, having been removed by the process. To form the acid sulphate of soda, take sulphate of soda, add thereto an excess of sulphuric acid, preferably, but not necessarily, heated, allow it to cool, and collect the crystals of bisulphate of soda thus produced. Apply sufficient heat to the crystals of bisulphate of soda to cause them to dissolve without the addition of water or any other admixture. To the thus dissolved bisulphate of soda add the trioxide of chromium, stirring. The result is a plastic compound which should be packed in air-tight vessels until used. If it is desired to form it into a substantially dry compound, this may be done by allowing the mixture of bisulphate and trioxide to remain at a high temperature for a sufficient time to drive off as much as practicable of the water. The heat for this purpose should be below the boiling-point, and care should be taken that the heat be not sufficient or continued long enough to convert any part of the chromium into sesqui-oxide of chromium.

The amount of trioxide which is to be added to the dissolved bisulphate is immaterial from a chemical standpoint, being regulated only by questions of economy and the special form of battery to be used. In the absence of any special conditions I would recommend the addition of the trioxide to the bisulphate in the proportion of about one to four, by weight.

I claim as my invention—

1. The process of making a chromic-battery compound, consisting of the following steps: first, taking bisulphate of soda and trioxide of chromium manufactured separately; second, dissolving the crystals of the bisulphate by heat without the addition of water, and, third, adding thereto the trioxide of chromium, stirring, substantially as described.

2. The process of making a chromic-battery compound, consisting of the following steps: first, adding an excess of sulphuric acid to sulphate of soda, allowing it to cool, and collecting the crystals of bisulphate of soda thus produced; second, dissolving the bisulphate of soda by heat without the addition of water, and, third, adding trioxide of chromium thereto, stirring, substantially as described.

In witness whereof I hereunto subscribe my name, in the presence of two witnesses, at New York, this 2d day of July, 1889.

WM. P. KOOKOGEY.

Witnesses:
LINDLEY VINTON,
SALTER STORRS CLARK.